United States Patent [19]

Meurer

[11] 4,221,671
[45] Sep. 9, 1980

[54] UPRIGHT CIRCULAR TUBE SETTLER WITH STACKED TUBE MODULES

[76] Inventor: Charles L. Meurer, 5937 E. Weaver Cir., Englewood, Colo. 80111

[21] Appl. No.: 15,108

[22] Filed: Feb. 26, 1979

[51] Int. Cl.$^2$ ............................................. B01D 43/00
[52] U.S. Cl. .................................................. 210/522
[58] Field of Search ................. 210/83, 513, 521, 522, 210/150, 151; 55/497, 498, 442; 261/112, DIG. 72

[56] References Cited

U.S. PATENT DOCUMENTS 3,491,892   1/1970   McCann ............................... 210/521

*Primary Examiner*—Frank Sever
*Attorney, Agent, or Firm*—Edwin L. Spangler, Jr.

[57] ABSTRACT

This invention relates to cylindrical tube settlers of the type having a tank with a settling basin therein to receive particulates or some other settleable fraction including fluids consisting of opposed cylindrical wall surfaces containing a latticed network of inclined fluid-flow passages and, more particularly, to a tube settler of the type aforementioned wherein said flow passages are comprised of two or more donut-shaped tube modules stacked one atop another to define a multiplicity of continuous segmented fluid-flow passages spiralling around the tank. The invention also encompasses an arrangement wherein the fluid-flow passages in each module are essentially straight and also one in which these passages are arranged in concentric circular rows with the radially aligned passages in different rows of the same module essentially paralleling one another.

12 Claims, 7 Drawing Figures

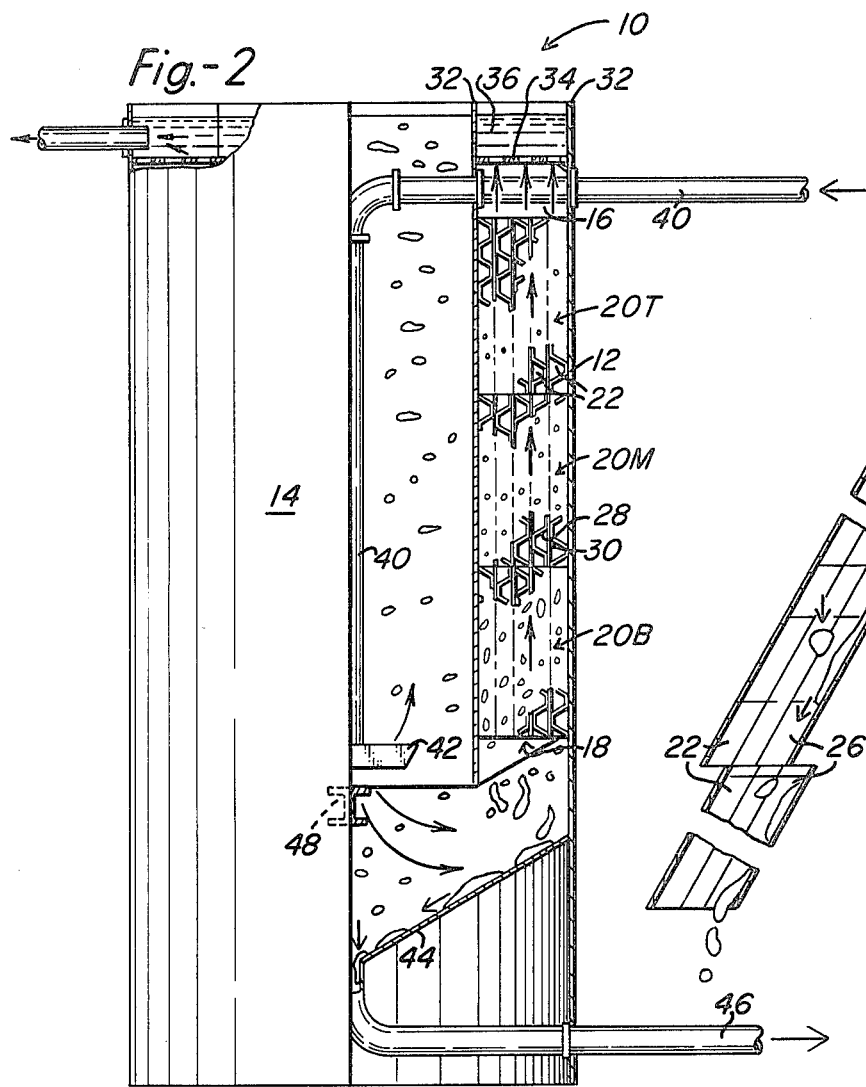
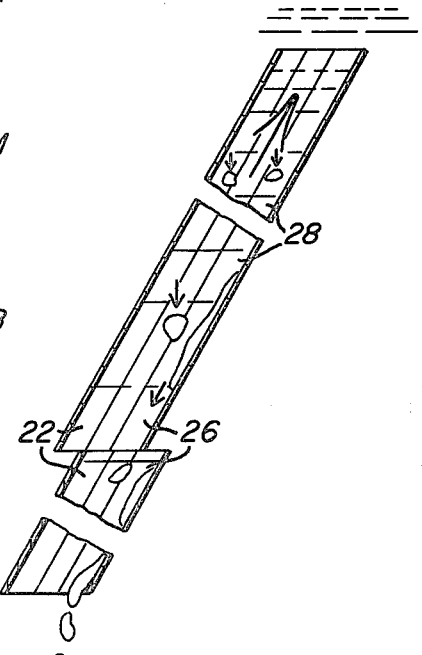
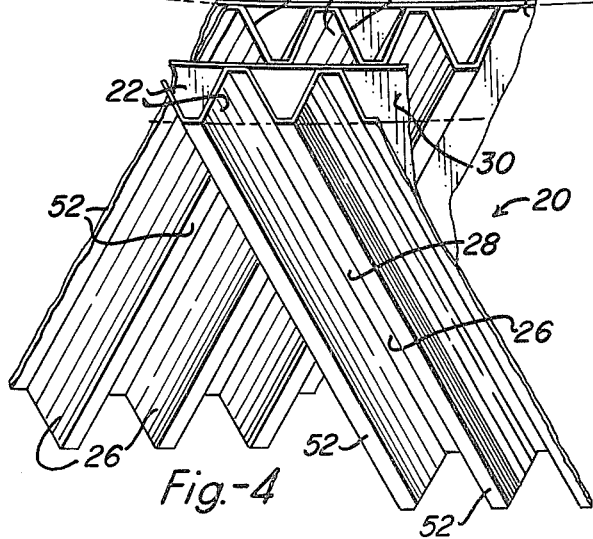

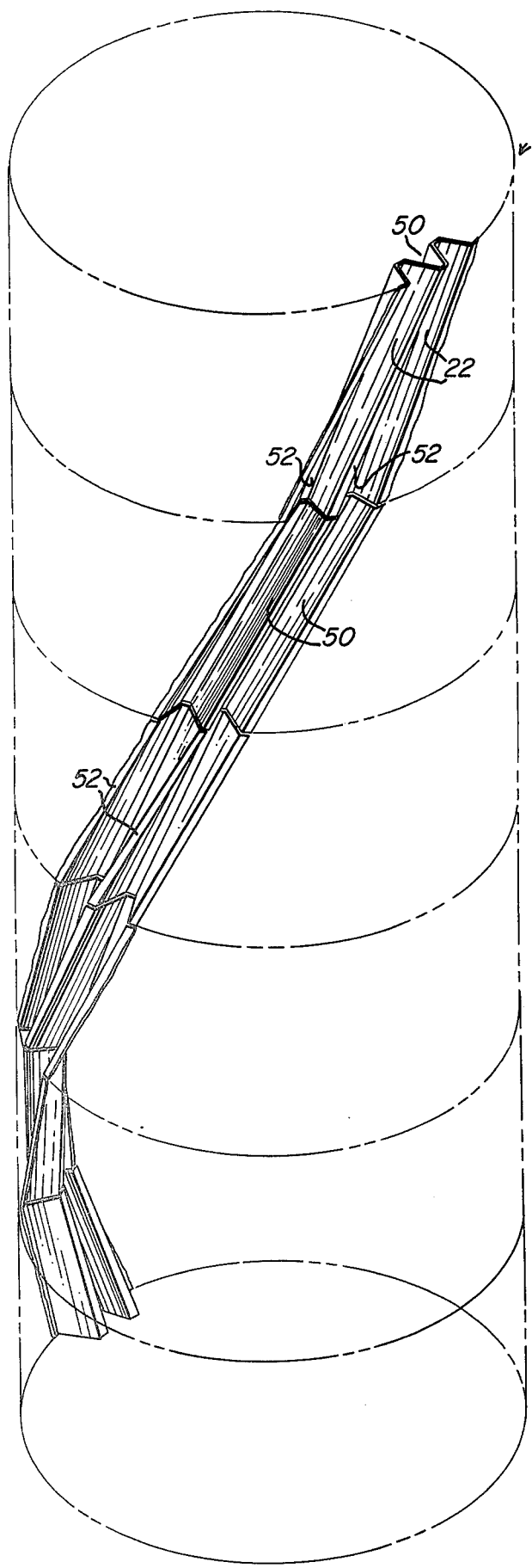
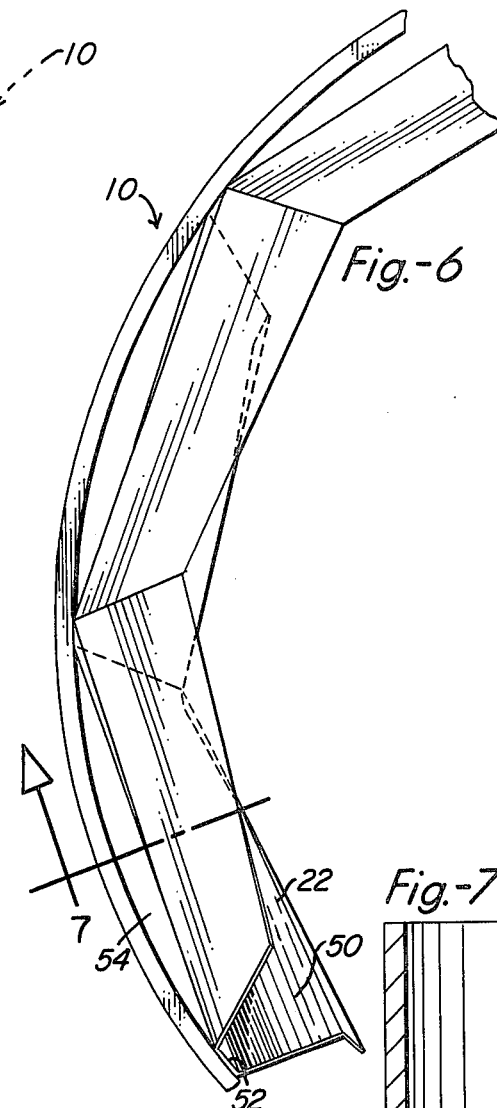
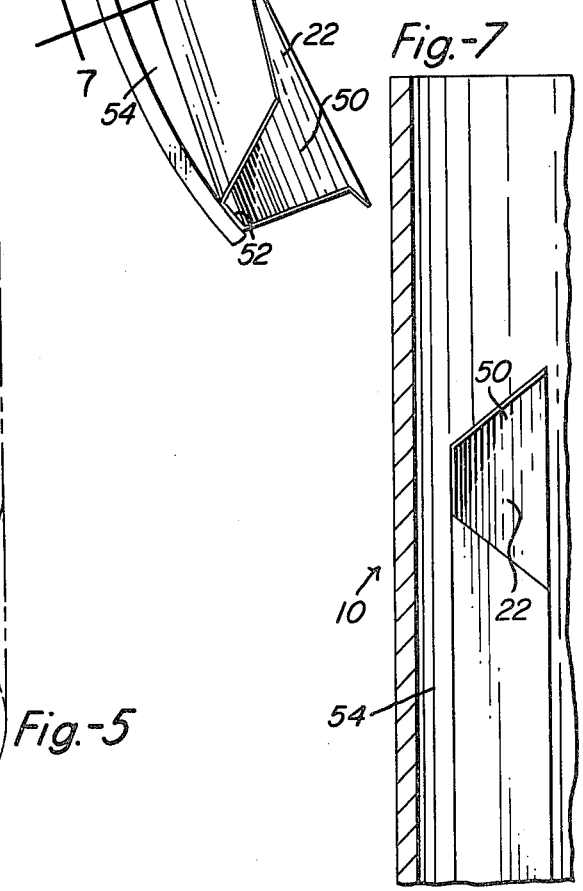
Fig.-5
Fig.-6
Fig.-7

UPRIGHT CIRCULAR TUBE SETTLER WITH STACKED TUBE MODULES

Removal of solids from fluids and sometimes one fluid from another is an age-old problem for which there are many solutions, some complex, some simple, many expensive and none completely effective in all situations. Ordinary settling basins are, perhaps, the simplest form of a solids-removal system, most of these being natural rather than manmade since all lakes, ponds and other quiescent confined bodies of water function to some degree as clarifiers.

Quite a number of years ago it was discovered that the rate of removal of the particulates in such an essentially passive system could be increased many many times by permitting the influent to percolate slowly up through steeply inclined flow passages formed between spaced substantially parallel plates or tubes with the latter producing the best results. These clarifiers or so-called "tube settlers" come in several shapes, tube configurations, sizes, etc., all of which admit to classification. For present purposes, however, they can be considered on the basis of the shape of the tank or basin in which the tubes are housed, one being rectangular and the other circular. It is to the latter type or shape that the present invention relates.

Tube modules employing corrugated members separated by planar sheets are old in the art, U.S. Pat. No. 3,232,865 to Quinn et al providing a good example thereof in the modification illustrated in FIG. 2. Inclining the fluid flow passages is, of course, an old idea as is that of inclining the tubes in adjacent rows in opposite directions, Bredberg's U.S. Pat. No. 3,262,682 along with McCann 3,491,892 evidencing such an arrangement. Of the foregoing, only the latter patent specifically deals with cylindrical settling basins; however, even there, the tube modules are rectangular, not curved.

Other specific types of circular clarifiers are known, the most common being the conical ones exemplified by Arbuckle's early U.S. Pat. No. 1,020,013 and British Pat. No. 386,312. The cylindrical as opposed to conical settling basin has certain cost and structural advantages but, unfortunately, up until now fitting them with tube modules proved to be difficult.

Cylindrical tube settlers present certain problems in connection with efficient space utilization that, while present to a slight degree in the rectangular ones, become an overriding consideration in the round ones. To begin with, tube lattices arranged in straight parallel rows inclined at the usual 60° and inserted into a cylindrical tank or basin with its axis vertical, leave vast areas either without any tubes at all or, alternatively, with the fluid-flow passages defined thereby blocked off at one end by a wall of the vessel such that the effect is the same as leaving the tube out altogether. In addition, complex and expensive contouring of the tube lattices to conform closely with the vessel walls becomes a necessity, otherwise, gaps remain through which unclarified fluid can completely bypass the tubes and escape with the effluent as a contaminant.

So far, about the only practical solution to the problem of inefficient space utilization has been that of tilting the vessel housing the tubes such that its axis parallels them thereby effectively filling the vessel with tubes. In the process of solving one problem, however, others have been created, the most noteworthy of which are the greater space required outside the vessel and the often complex and expensive framework required to support it in inclined position. The significance of the latter problem becomes apparent when one considers that a cylindrical vessel or tank disposed with its axis vertical is essentially self supporting.

Some of the previously described space utilization problems inherent in a circular tube settler were solved by applicant when he designed a tube settler module with concentric rows of inclined tubes in which each row was curved about the vertically-oriented axis of the tank as a center. It was discovered, however, that with the tubes in each concentric row being essentially straight and steeply angled relative to the vertical, large gaps were still left between the tubes and cylindrical tank walls in all but the shallowest of large diameter tanks. The effect on the outer cylindrical wall was one of inscribing a straight chordal line between two circumferentially-spaced points on the curved surface displaced vertically by the vertical dimension of the tube lattice. The smaller the radius of the tank and the greater the height of the tube lattice, the greater the gap left between the horizontal circles of tangency both top and bottom.

To further complicate the problem, such vessels almost always include a cylindrical center well, the cylindrical wall of which cooperates with an outer concentric wall of the tank to produce a more or less donut-shaped tube well. These same straight tubes lay in tangent relation to the center well wall midway between their ends leaving the top and bottom margins thereof spaced a good distance away. Since for all practical purposes, the cylindrical tank housing the tubes will be at least a minimum of several feet deep, the use of a tube lattice made up of straight tubes the full height of the tube package ends up just about as bad from a space utilization standpoint as trying to fit straight rows of inclined tubes into the tank.

Upon initial analysis, one rather obvious solution to the circular donut-shaped tube well suggests itself, namely, that of filling the well with curved tubes spiralling their way down into the tank in continuous line contact with adjacent tubes or a tank wall; however, a closer analysis reveals some serious problems, one of the most significant being the need for tubes of graduated size so that the innermost concentric row of tubes would contain the same number of tubes as the outermost one and all would either nest or align radially thereby maintaining continuous line contact with each other. If this were done, and it does appear to be possible even though prohibitively expensive, the flow characteristics of the clarifier would not remain the same in each tube row due to their different sizes. The alternative of using smoothly-curved spiralling tubes of the same size would certainly tend to eliminate the differences in flow characteristics even though the inner tubes were more tightly wound than the outer ones; nevertheless, other problems remain such as having to curve the tubes of each row differently than those of all other rows, the difficulties associated with nesting one row in the adjacent rows on either side thereof, curving the tubes on the inner rows about a short radius, etc. It would certainly appear, therefore, that such a solution is manifestly impractical on all but the most highly specialized applications where the exhorbitant cost of fabricating such a tube bundle could be tolerated.

It has now been found in accordance with the teachings of the instant invention that the shortcomings inherent in the circular tube settlers with a tilted tank axis can, in large measure, be eliminated while, at the same time, preserving most of the space utilization efficiency present in such a design and in a vertical tank with curved spiral tubes by the simple, yet unobvious, expedient of stacking two or more tube modules atop one another that contain straight but inclined tubular passages therethrough that interconnect when placed in end-to-end relation to define continuous segmented fluid-flow paths spiralling up through the receiving vessel or down as the case may be depending upon the direction of flow. These fluid-flow paths spiral about the vertical axis of the receiving vessel as a center, those nearer the center defining a tighter spiral than those on the outside. While all concentric rows may have their fluid-flow paths spiralling in the same direction, even numbered rows can, if desired, be made to spiral in one direction while the odd numbered ones spiral in the opposite direction due to the opposite inclination of the tubular passages in adjacent rows. In the preferred embodiment, each module consists of two or more arcuate sections joined together to produce a continuous circular donut-like subassembly. In tanks or other receiving vessels having wide tube wells, two or more arcuate sections sized to join together in circumferential concentric relation may be used in place of a single full width module to bridge the gap between the center well of the tank and the outer wall of the tube well. The tubular passages themselves are preferably formed from sheets of moldable material formed to provide inclined corrugations covered both inside and out by cylindrical partition walls except for the exterior corrugated surfaces that mate with a vessel wall or a partition wall of an adjacent concentric module section. Precise end-to-end alignment of the tubular passages in adjacent stacked modules is preferred but not essential.

It is, therefore, the principal object of the present invention to provide a novel and improved tube bundle for use in circular tanks having their axes vertical.

A second objective of the invention is the continuous rings of segmented straight tubes.

An additional objective is the provision of a tube bundle with spiralling tubes each consisting of at least two straight tubes connected end-to-end.

Further objects are to provide a circular tube settler that is simple, compact, efficient, easy to fabricate, strong, relatively inexpensive, free of service problems and even quite decorative.

Other objects will be in part apparent and in part pointed out specifically hereinafter in connection with the description of the drawings that follows, and in which:

FIG. 2 is a section to a slightly smaller scale taken along line 2—2 of FIG. 1;

FIG. 3 is a greatly enlarged fragmentary view partly in section and partly in elevation showing a pair of tubular passages in adjoining modules as they would appear when slightly misaligned with the partition wall between concentric rows removed;

FIG. 4 is a fragmentary perspective view to a scale somewhere between that of FIGS. 2 and 3 showing one type of module construction wherein adjacent concentric rows of tubular passages are inclined in opposite directions with respect to the vertical;

FIG. 5 is a perspective view much like FIG. 1 and to the same scale but showing only three of the segmented troughs that cooperate with the partition walls when covered by the latter to define the spiralling fluid flow passages;

Figure 1:
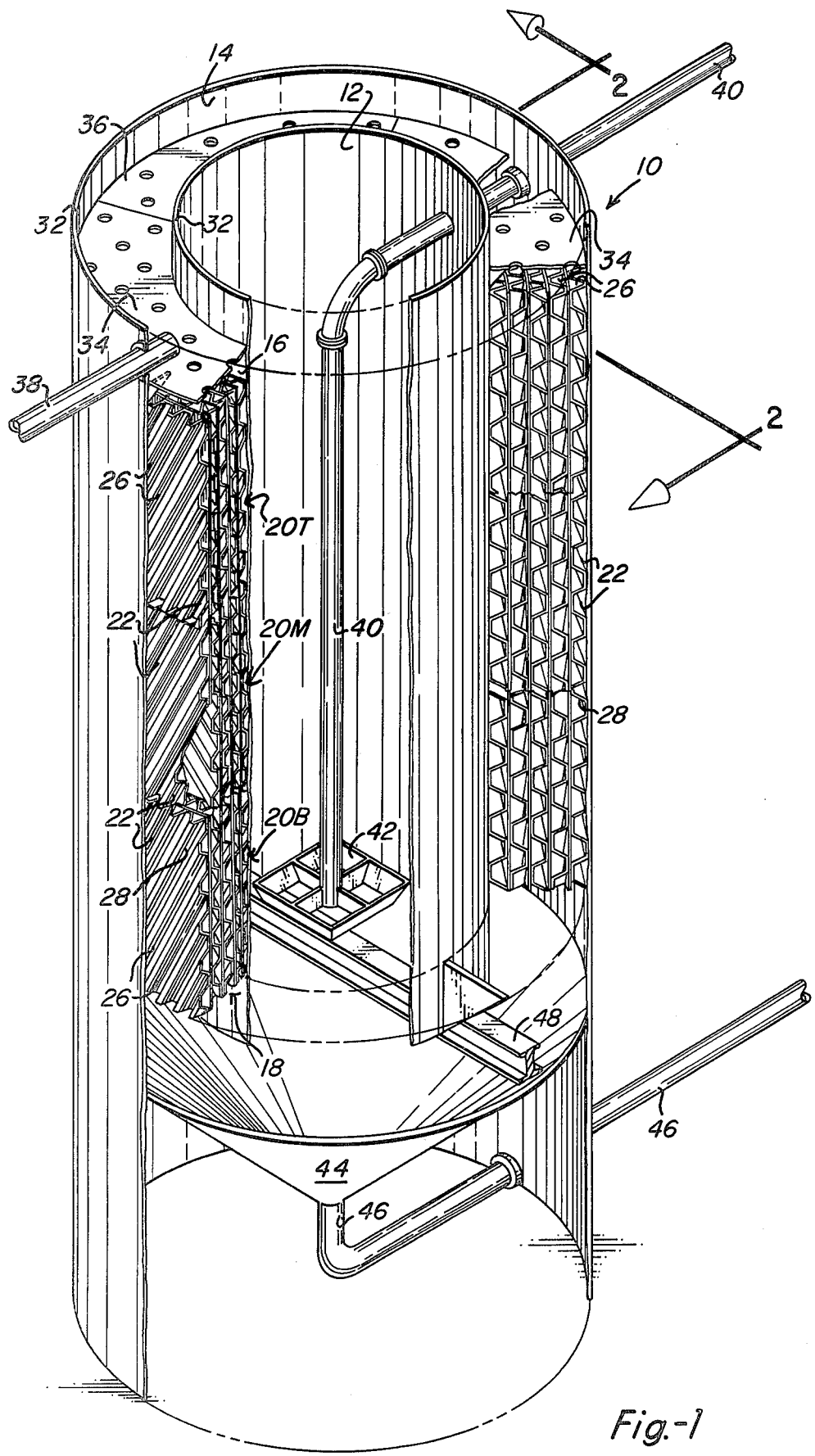
FIG. 1 is a perspective view of a deep center well clarifier fitted with tiers of tube modules stacked three high, portions of the tank and modules having broken away and shown in section to more clearly reveal the interior construction.

FIG. 6 is a fragmentary horizontal section greatly enlarged showing a single segmented trough on the outside cylindrical wall of the receiving vessel as it spirals along the latter; and, FIG. 7 is a fragmentary section taken along line 7—7 of FIG. 6 and to the same scale as the latter view showing the minimal gap left between the straight tubular passages of the several modules and the adjacent vessel wall.

Referring next to the drawings for a detailed description of the present invention and, initially, to FIGS. 1 and 2 for this purpose, reference numeral 10 broadly represents a solids contact clarifier having a cylindrical center well 12 surrounded in spaced concentric relation by a cylindrical basin or tank wall 14, these walls cooperating to define an annular tube well 16 therebetween into which a tube bundle indicated in a general way by numeral 18 is placed. This tube bundle in accordance with the teaching of the instant invention comprises two or more modules broadly indicated by numeral 20 which are stacked one atop another and which cooperate when thus arranged to define segmented fluid-flow passages 22 spiralling around the interior of the tube well. Each module 20 is made up of general concentric rows 24 of straight, but inclined, tubular passages 26 defined by layers of corrugated sheets 28 separated from one another by arcuate partition walls 30 interposed therebetween. In the particular clarifier illustrated, the top of the uppermost tube module 20T is spaced beneath the rim 32 of the tube well and covered by apertured plates 34 which cooperate with cylindrical walls 12 and 14 to define an overflow launder 36 to catch the clear effluent from the tube bundle. Pipe 38 siphons off or otherwise removes the clear effluent from the launder while pipe 40 delivers the influent to a standard deflector 42 which distributes it into the conical bottom 44 of the basin. Sludge and other solids collected in the bottom are removed through sludge line 46. Beam 48 extending diametrically across the tank or basin above the conical bottom supports the tube bundle and wall 12 of the center well.

Directing the attention next to FIGS. 3–7, it can be seen that the tubular passages 22 in each module are straight or essentially so, there being some warpage and tendency to bend and twist slightly so as to conform with adjacent rigid cylindrical wall surfaces 12 and 14 due to the relatively thin plastic sheeting from which the particular corrugated sections 28 and partition walls 30 are fabricated. No attempt is made, however, to curve these tubular passages so as to maintain continuous line contact with the cylindrical walls of the tank and center well. These tubular passages in the particular form shown have a generally trapezoidal cross section except that the inside and outside walls thereof are curved slightly about the axis of the tank as a center. These inside and outside passage walls may consist of either the partition wall 30 that closes the open side of the trough-like corrugations 50 (FIGS. 5, 6 and 7) or, in alternate corrugations, it will be the shorter integral wall 52 that lies flush against the partition wall and is adhesively fastened thereto in all instances except where the corrugations are left uncovered. Now, it is important to note that for purposes of the present invention, the particular trapezoidal shape of tubular passages 26, while preferred, is not of primary significance nor is their size or inclination relative to the vertical or to those in adjacent rows. Diamond-shaped or triangular passages could be used as well as chevron-shaped ones. In fact, modules formed from square, rectangular or even round tubes could be used in accordance with the teaching of the instant invention so long as they consisted of essentially straight tubes or tubular passages and two or more of such straight tube modules 20 were stacked one atop the other in the manner of modules 20B, 20M and 20T of FIGS. 1 and 2. Regardless of the cross section of the individual tube or tubular passages within each module, for best results, they should be arranged in concentric circular rows about the tank axis as a center. To do so minimizes cutting and greatly simplifies fabrication of the modules.

For purposes of illustration and space conservation, a small diameter but relatively deep clarifier has been illustrated in FIGS. 1 and 2; whereas, in actual practice, such a unit would likely be considerably larger in diameter. In larger units having wider tube wells, two or more arcuate concentric modules 20 would probably be used to bridge the gap between the center well and outside basin wall rather than a single one as shown since smaller modules are much easier to fabricate, ship and handle. When this is done, the partition wall 30 is left off the adjacent surface of one of the mating modules so that no two partition walls lie next to one another and possibly provide an escape route through which the influent could bypass the tubes. The same is true of the interior and exterior rows of the bundle when the corrugations are left open to mate with the adjacent tank and center well walls. In a similar manner, for ease of fabrication and installation, no useful purpose is served by fabricating the modules in a complete ring. Instead, it is preferably cut into at least two, and usually several arcuate sections, which can be joined together in end-to-end relation to produce the donut-shaped ring module.

Briefly with reference to FIG. 3 and comparing the latter with FIGS. 1 and 5, it can be seen that the passages 26 in adjacent stacked modules need not necessarily be in precise alignment because most solids and even some dense fluids will still settle out in much the same way as they would in aligned ones. Particulate matter or fractions of dense fluid that miss one passage or tube will merely fall into another and eventually gravitate toward the bottom of the vessel where they collect and can be removed. On the other hand, there is no advantage gained by misaligning the passages as shown in FIG. 3 and, therefore, the preferred arrangement is that shown in FIGS. 1 and 5, especially when it is easily achieved. Also, in those instances when the influent includes stringy materials, precise passage alignment does, in fact, become important because, without it, the edges of the corrugations intersecting the passages thereabove will catch and retain such materials as they migrate toward the bottom or the top as the case may be thus causing the passage to plug.

FIG. 4 reveals an arrangement of tubular passages 26 within a given module wherein those in even numbered concentric rows are tilted in one direction while those in the odd numbered rows are tilted in the opposite direction. Functionally, the passages in all rows can tilt in the same direction with no adverse effect whatsoever on the operation of the clarifier.

All of these passages are preferably inclined at the same angle to the vertical, usually about 30° although other angular inclinations may be better under certain flow conditions, fluid viscosities and the like. Each passage is also preferably the same size as the others which, of course, means that there will be fewer such passages in the interior rows than those farther out on the perimeter. By keeping the tubular passages the same size, fabrication is made much easier and, in addition, the settling rates remain essentially constant all the way across the tube bundle. By using alterate layers of corrugated and plain sheeting to form the tubular passages, there is no nesting anyway so the fact that the tubular passages do not align radially becomes of no consequence whatsoever.

Finally, with particular emphasis on FIGS. 5, 6 and 7, the essential features of the instant invention will be explained in somewhat greater detail. FIGS. 1 and 2 showed tube modules 20 stacked three high while FIG. 5 shows a stack of six. In a tube bundle of the same overall height for use in a tube well of the same size, the tubes of the three tier stack will, obviously, be twice as long as those of the six tier stack. More important, the opposite ends of the tubes of each module in the six tier stack will make contact with the outer cylindrical basin wall after spanning an arc on the latter only half as long as that of the larger tubes so the gap 54 at the midpoint thereof will be only half as wide. The more modules in the stack, the more of the tube well is filled with fluid-flow passages and the greater the treatment capacity of the clarifier. Obviously, as the segments of the segmented fluid-flow passage 22 become shorter and shorter, it approaches a curve made up of infinitely short straight-line segments. The trade off is, of course, the loss in capacity of the clarifier using stacked modules of straight tubes vs. the expense associated with filling the tube well with spirally-curved tubes. As a practical matter, the loss in capacity occasioned by using modules around two feet high or less is virtually insignificant when compared with the cost of curved tube bundles. Conversely, the modest gains realized by cutting the module height much under a foot also become insignificant because a few inch increase in tube well size will easily restore the lost capacity. Accordingly, field tests have indicated that a module somewhere between one and two feet high is quite satisfactory with an eighteen to twenty inch one being about ideal. While not illustrated specifically, it will be apparent that the tubes touch the center well wall at their midpoints leaving the ends thereof spaced outside the latter. The same foreshorting of the modules lessens these interior gaps in like manner to the exterior ones. So far, the amount of influent that by passes the tube bundle through these gaps not proven to be significant but, if it ever does, simple baffles or partitions blocking them off provide an easy solution to the problem.

It should also be noted that increasing the diameter of the tube well enables one to use higher modules with longer tubes because the curve of the cylindrical walls becomes less. Even so, the increased expense of the larger vessel is far outweighed by the advantage of a few inch deeper tube module. It is far simpler, in other words, to just stack up more thinner modules than to increase the tube well size as is readily apparent from comparing FIGS. 1 and 5. On the other hand, tube wells having an inside diameter anything less than about six feet create manufacturing problems in trying to fabricate modules bent into such a tight curve. Accordingly, while stacked modules in which each module is deeper than approximately two feet or shallower than approximately one foot will function quite satisfactorily to settle out particulate matter, those within this size range do a very adequate job of filling the tube wells of most clarifiers without any appreciable sacrifice in space utilization inside the tube well.

What is claimed is:

1. For use in a tube settler of the type having vertically-disposed concentric tubular walls cooperating to define a tube well within a tank having a settling basin to receive the heavier settleable materials in the bottom, at least two donut-shaped tube modules stacked one atop another in tiered relation, each of said modules containing concentric rows of essentially straight fluid flow passages open at both ends, the passages in each row of a particular module being tilted relative to the vertical in the same direction and to substantially the same degree the passages in each row being skewed in relation to all other passages the same row of the same tier, the, passages in each row of each tier connecting in fluid-conducting relation into at least one passage of at least one module in an adjacent tier, and the essentially straight passages thus connected, cooperating to provide means for directing fluid in a substantially spiral path around the tank.

2. The invention in accordance with claim 1 wherein the fluid flow passages in corresponding rows of adjacent tiers are tilted in the same direction.

3. The invention in accordance with claim 1 wherein connecting passages in adjacent tiers are essentially the same size and shape and are arranged in end-to-end substantially registered relation to one another.

4. The invention in accordance with claim 1 wherein the tiers are made up of modules of substantially the same height.

5. The invention in accordance with claim 1 wherein the fluid flow passages at least within the interior of the modules are defined by radially-spaced concentric generally cylindrical partition walls and corrugated spacers, the corrugations of said spacers bridging the space between adjacent pairs of said partition walls.

6. The invention in accordance with claim 5 wherein every other fluid flow passage on the exterior of a module is defined by one of the tank walls and the corrugations of the spacer opening toward the latter.

7. The invention in accordance with claim 1 wherein the fluid flow passages are generally trapezoidal shaped.

8. The invention in accordance with claim 1 wherein each module is divided into at least two arcuate sections arranged in end-to-end relation to define a continuous ring.

9. The invention in accordance with claim 1 wherein the tiers are between approximately one and two feet high.

10. The invention in accordance with claim 1 wherein the modules comprise at least two concentric rings cooperating to bridge the space between the walls of the tube well.

11. The invention in accordance with claim 1 wherein the fluid flow passages are all substantially the same size and shape.

12. The invention in accordance with claim 1 wherein the concentric rows in adjacent tiers are vertically aligned.

* * * * *